(12) United States Patent
Shin et al.

(10) Patent No.: US 9,179,331 B2
(45) Date of Patent: Nov. 3, 2015

(54) WIRELESS LOCALIZATION METHOD AND WIRELESS LOCALIZATION APPARATUS USING FINGERPRINTING TECHNIQUE

(71) Applicant: SOONGSIL UNIVERSITY RESEARCH CONSORTIUM TECHNO-PARK, Seoul (KR)

(72) Inventors: Yo An Shin, Seoul (KR); Kwang Yul Kim, Seoul (KR); Ai Lan Hong, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 187 days.

(21) Appl. No.: 13/731,538

(22) Filed: Dec. 31, 2012

(65) Prior Publication Data

US 2014/0120931 A1 May 1, 2014

(30) Foreign Application Priority Data

Oct. 31, 2012 (KR) .................. 10-2012-0122330
Nov. 30, 2012 (KR) .................. 10-2012-0137717

(51) Int. Cl.
*H04W 24/02* (2009.01)
*H04W 64/00* (2009.01)
*G01S 5/02* (2010.01)

(52) U.S. Cl.
CPC ............. *H04W 24/02* (2013.01); *G01S 5/0252* (2013.01); *H04W 64/00* (2013.01)

(58) Field of Classification Search
CPC ........ H04W 24/02; H04W 64/00; G01S 5/00; G01S 5/0252

USPC ........................................... 455/452.1, 456.1
See application file for complete search history.

(56) References Cited

U.S. PATENT DOCUMENTS

| | | | |
|---|---|---|---|
| 8,350,758 B1* | 1/2013 | Parvizi et al. ............. | 342/452 |
| 2008/0261622 A1* | 10/2008 | Lee et al. ............... | 455/456.2 |
| 2011/0039580 A1* | 2/2011 | Wigren et al. ............ | 455/456.1 |
| 2013/0045750 A1* | 2/2013 | Kim et al. ................. | 455/456.1 |
| 2014/0018095 A1* | 1/2014 | Parvizi et al. ............ | 455/456.1 |
| 2014/0228048 A1* | 8/2014 | Saito et al. ............... | 455/456.1 |
| 2014/0243011 A1* | 8/2014 | Pan et al. ................. | 455/456.1 |

FOREIGN PATENT DOCUMENTS

KR 10-2011-0011656 A 10/2011

* cited by examiner

*Primary Examiner* — Marisol Figueroa
*Assistant Examiner* — Jean Chang
(74) *Attorney, Agent, or Firm* — Paratus Law Group, PLLC (57) ABSTRACT

A wireless localization method using a fingerprinting technique that performs localization by using a plurality of access points and a plurality of sample points arranged at regular distances, the wireless localization method includes: detecting first through third sample points adjacent to a predetermined node from among the plurality of sample points via the fingerprinting technique; calculating corrected coordinates by using a received signal strength (RSS) between the predetermined node and the first sample point, an RSS value between the predetermined node and the second sample point, an RSS value between the first and second sample points, an RSS value between the first and third sample points, and a distance between the plurality of sample points; and estimating a location of the predetermined node by reflecting the corrected coordinates on coordinates of the first sample point.

11 Claims, 6 Drawing Sheets

WIRELESS LOCALIZATION METHOD AND WIRELESS LOCALIZATION APPARATUS USING FINGERPRINTING TECHNIQUE

CROSS-REFERENCE TO RELATED PATENT APPLICATION

This application claims the benefit of Korean Patent Application No. 10-2012-0122330, filed on Oct. 31, 2012, and Korean Patent Application No. 10-2012-0137717, filed on Nov. 30, 2012, in the Korean Intellectual Property Office, the disclosure of which is incorporated herein in its entirety by reference.

BACKGROUND OF THE INVENTION

1. Field of the Invention

The present invention relates to a wireless localization method and a wireless localization apparatus, which use a fingerprinting technique, and more particularly, to a wireless localization method and a wireless localization apparatus, which use a fingerprinting technique, wherein a location of a predetermined node is estimated by using a received signal strength (RSS)-based fingerprinting wireless localization technique, and a frequency is assigned according to regions by using the estimated location.

2. Description of the Related Art

Wireless localization technologies and various applications for providing a location-based service (LBS) are being developed according to a rapid increase of smart phone users and innovative development of mobile communication technologies. Examples of such a technology for providing location information include a global positioning system (GPS) using a satellite network, and a mobile communication network based wide area wireless localization technology. Recently, studies on wireless localization techniques using a wireless local area network (WLAN), ZigBee, or Bluetooth indoor and outdoor are being actively performed.

Specifically, it is important to provide location information in real-time by using wireless localization, even in a machine-to-machine (M2M) communication providing various types of information about a person and an object as a machine and an information technology (IT) are combined together. Factories are gradually turning to intelligent autonomous production. Managers of such factories are aiming at recognizing and managing operation states, locations, and environments of machines in the factories by using the M2M communication and the wireless localization technology. However, WLAN, Bluetooth, and ZigBee usable in M2M factories share industrial scientific medical (ISM) bands, and thus frequency interference may be generated between machines. Moreover, performance may be deteriorated, such as quality deterioration and delay, due to communication inability or communication error caused by the frequency interference.

Techniques for efficiently managing signal frequency interference generated in the M2M communication as such need to be studied. Examples of a conventional method of managing frequency interference include a cognitive radio method, a power control method, and a beamforming method.

First, according to the cognitive radio method, if a primary user assigned with a certain frequency does not use the certain frequency, a secondary user may use the certain frequency without interfering with the primary user. Accordingly, an empty frequency band may be suitably used to prevent frequency resource scarcity, and since a frequency resource limited by a situation cognitive ability may be reused according to time, space, and region, frequencies may be efficiently managed while avoiding interference. Also, since the cognitive radio method may actively react to given environments, a best quality of service in the given environment may be guaranteed to a user using a cognitive radio system, and thus the cognitive radio method is getting the limelight in recent next-generation wireless communication fields. However, complexity of the cognitive radio method may be remarkably increased when all frequency bands are detected without omission for frequency interference management and an empty frequency band is used.

The power control method is a simplest method for suppressing frequency interference, wherein transmission power is adjusted such that a signal is transmitted at minimum transmission power that satisfies required communication quality. The power control method is currently used in most wireless communication systems, specifically to prevent interference between cells in a mobile communication system.

The beamforming method uses a smart antenna, wherein a beam of an antenna is steered only to a corresponding terminal. Here, a radiation pattern of the smart antenna is prepared by forming beams in a direction of a mobile terminal or a target and removing a beam pattern of the target or the mobile terminal that is not desired or is in the way. However, such conventional methods have low economic efficiency since they are widely used in cellular network environments, have massive throughputs, and need a separate apparatus aside from an M2M apparatus used in indoor factories.

Thus, frequency interference may be efficiently managed by improving wireless localization performance when a fingerprinting technique that is recently getting the spotlight as an indoor wireless localization technology is applied to the frequency managing technique. A background technology of the present invention is disclosed in KR2011-0116565.

SUMMARY OF THE INVENTION

The present invention provides a wireless localization method and a wireless localization apparatus, which use a fingerprinting technique that estimates a location of a predetermined node by using a fingerprinting wireless localization technique and assigns a frequency according to regions by using the estimated location.

According to an aspect of the present invention, there is provided a wireless localization method using a fingerprinting technique that performs localization by using a plurality of access points and a plurality of sample points arranged at regular distances, the wireless localization method including: detecting first through third sample points adjacent to a predetermined node from among the plurality of sample points via the fingerprinting technique; calculating corrected coordinates by using a received signal strength (RSS) between the predetermined node and the first sample point, an RSS value between the predetermined node and the second sample point, an RSS value between the first and second sample points, an RSS value between the first and third sample points, and a distance between the plurality of sample points; and estimating a location of the predetermined node by reflecting the corrected coordinates on coordinates of the first sample point.

The wireless localization method may further include assigning a frequency corresponding to the estimated location with respect to the predetermined node.

The calculating of the corrected coordinates may include: estimating an $RSS_x$ value and an $RSS_y$ value respectively corresponding to location difference values of the predetermined node in an x-axis and an y-axis with respect to a location of the first sample point, by using the RSS value between the predetermined node and the first sample point, the RSS value between the predetermined node and the second sample point, and the RSS value between the first and second sample points; and calculating an x-axis corrected coordinate $\hat{x}$ by reflecting the distance between the plurality of sample points to a ratio of the $RSS_x$ value to the RSS value between the first and second sample points, and calculating an y-axis corrected coordinate $\hat{y}$ by reflecting the distance between the plurality of sample points to a ratio of the $RSS_y$ value to the RSS value between the first and third sample points.

The estimated $RSS_x$ and $RSS_y$ values may be defined according to equations below:

$$RSS_x = \frac{RSS_{CD}^2 + RSS_{DU}^2 - RSS_{CU}^2}{2RSS_{CD}}$$

and $$RSS_y = \sqrt{RSS_{DU}^2 - RSS_x^2},$$

wherein $RSS_{CD}$ denotes the RSS value between the first and second sample points, $RSS_{DU}$ denotes the RSS value between the predetermined node and the first sample point, and $RSS_{CU}$ denotes the RSS value between the predetermined node and the second sample point.

The x-axis corrected coordinates $\hat{x}$ and the y-axis corrected coordinates $\hat{y}$ may be calculated according to equations below:

$$\hat{x} = \frac{RSS_x}{RSS_{CD}}d, \quad \hat{y} = \frac{RSS_y}{RSS_{BD}}d,$$

wherein $RSS_{BD}$ denotes the RSS value between the first and third sample points and d denotes the distance between the plurality of sample points.

The location of the predetermined node may be estimated according to an equation below:

$$\hat{U} = D(x_D, y_D) \pm (\hat{x}, \hat{y})$$

wherein $\hat{U}$ denotes the estimated location of the predetermined node, $D(x_D, y_D)$ denotes a location of the first sample point, and ± is individually applied as + or − with respect to the x-axis corrected coordinate $\hat{x}$ and the y-axis corrected coordinate $\hat{y}$, according to a relative location of the predetermined node with respect to the first through third sample points.

According to another aspect of the present invention, there is provided a wireless localization apparatus using a fingerprinting technique that performs localization by using a plurality of access points and a plurality of sample points arranged at regular distances, the wireless localization apparatus including: a sample point detector for detecting first through third sample points adjacent to a predetermined node from among the plurality of sample points via the fingerprinting technique; a corrected coordinate calculator for calculating corrected coordinates by using a received signal strength (RSS) between the predetermined node and the first sample point, an RSS value between the predetermined node and the second sample point, an RSS value between the first and second sample points, an RSS value between the first and third sample points, and a distance between the plurality of sample points; and a location estimator for estimating a location of the predetermined node by reflecting the corrected coordinates on coordinates of the first sample point.

The wireless localization apparatus may further include a frequency assigner for assigning a frequency corresponding to the estimated location with respect to the predetermined node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, one or more embodiments of the present invention will be described in detail with reference to accompanying drawings to be easily executed by one of ordinary skill in the art.

The present invention is about a wireless localization method and a wireless localization apparatus, which use a fingerprinting technique. According to the present invention, for efficient frequency interference management in machine-to-machine (M2M) communication environments in intelligent factories, a location of a predetermined node is estimated by using a received signal strength (RSS)-based fingerprinting wireless localization technique, and a frequency is assigned according to the estimated location. Consequently, errors generated due to a mutual interference between wireless devices in a factory where frequencies are mixed may be reduced, and frequencies may be efficiently managed.

Figure 1A:
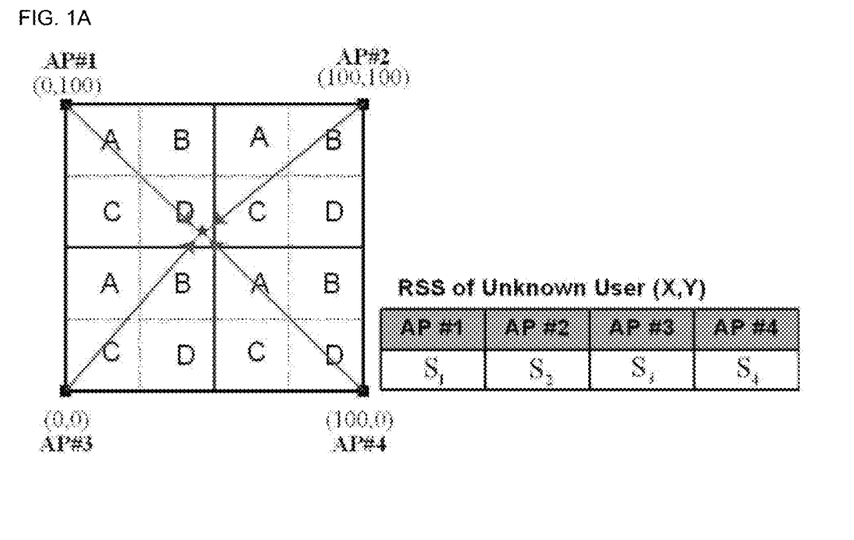
FIGS. 1A and 1B are diagrams for describing a general fingerprinting wireless localization technique applied to one or more embodiment of the present invention.

FIGS. 1A and 1B are diagrams for describing a general fingerprinting wireless localization technique applied to one or more embodiment of the present invention. Referring to FIG. 1A, a quadrangular region having a size of 100 m×100 m (100 m²) is formed by four access points AP#1 through AP#4, and a plurality of sample points (not shown) are arranged in the quadrangular region in a matrix form at regular intervals (for example, several meters). A fingerprinting technique performs localization by using the access points AP#1 through AP#4 and the sample points. Here, a point ★ corresponds to a location of a predetermined node to be localized. The quadrangular region formed by the access points AP#1 through AP#4 is divided into four regions, and each region is again divided into four sub-regions. The four sub-regions are regions for frequency assignment, and are distinguished by A, B, C, and D.

The fingerprinting technique is a method of estimating a location according to probabilistic modeling, wherein information about noise and surrounding environment is first stored in a database (DB), and a location of a terminal is estimated by using the information. The fingerprinting technique includes total two operations, i.e., an offline operation and an online operation.

Figure 1B:
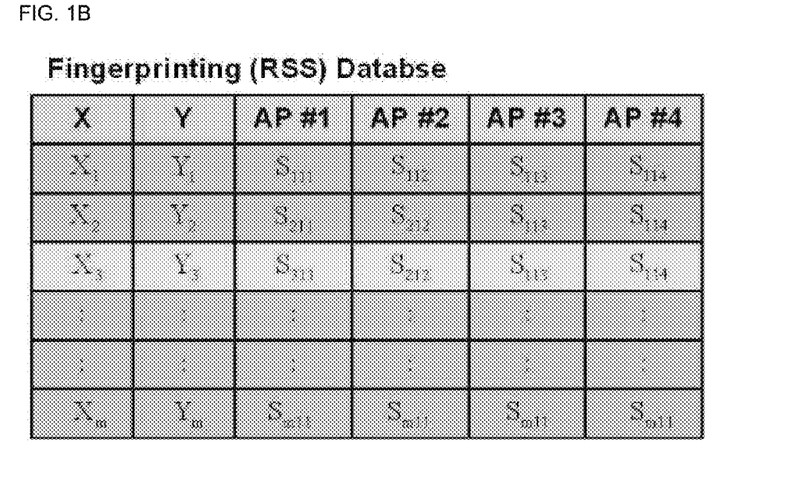

In the offline operation, a DB is built by measuring RSS values according to the sample points in a given environment via an area search. Referring to FIG. 1B, a DB is built for m sample points by obtaining RSS values between the m sample points and the access points AP#1 through AP#4, as RSS vector values. Coordinates of sample points are shown as $(X_1, Y_1)$ through $(X_m, Y_m)$.

In the online operation, the RSS value of a signal transmitted from each of the access points AP#1 through AP#4 to the predetermined node (at the location indicated by the star) is measured as a fingerprinting vector value, and the RSS vector value measured as such and a RSS vector value at each sample point stored in the DB are compared so as to estimate a location of a sample point having a minimum Euclidean distance as the location of the predetermine node.

Here, a pass loss model for obtaining the RSS value is represented by Equation 1 below.

$$P_{rx}[dBm] = P_{tx}[dBm] + K[dB] - 10\eta \log_{10}\left(\frac{d}{d_0}\right) + \Psi \quad \text{[Equation 1]}$$

Here, $P_{rx}$ denotes an RSS, $P_{tx}$ denotes a transmitted signal strength, K denotes a constant according to an environment, $d_0$ denotes a reference distance (predetermined to be 1 m), $\eta$ denotes a pass loss coefficient, and $\psi$ denotes a fading effect.

Also, the location of the predetermined node may be estimated by using an Euclidean distance according to Equation 2 below.

$$\hat{y} = \underset{i=1,\ldots,N}{\mathrm{argmin}}\left\{\sqrt{(DB_i - \mathrm{Unknown})^2}\right\} \quad \text{[Equation 2]}$$

Here, $\hat{y}$ denotes the estimated location, N denotes the number of sample points, $DB_i$ denotes an RSS vector value at each sample point obtained in the offline operation, and Unknown denotes an RSS vector value of the predetermined node whose location is to be determined. The fingerprinting technique described above is a well-known technology, and thus details thereof are omitted herein.

A process of assigning a frequency according to the estimated location is performed as follows. Here, it is assumed that a wireless local area network (WLAN) like the IEEE 802.11b standard is used for M2M wireless communication. At this time, 12 channels from total 14 channels available in the IEEE 802.11b standard may be assigned to each sub-region of FIG. 1A as shown in Table 1 (channel assignment plan according to sub-regions) below by using the location estimated during the general fingerprinting wireless location technique described above. Also, by using such a channel assignment plan, a frequency is assigned to the estimated location as shown in FIG. 1A. The sub-regions for assigning frequencies are classified into A, B, C, and D.

TABLE 1

| Sub-region | WLAN Available Channel | | |
|---|---|---|---|
| A | 1 | 2 | 3 |
| B | 4 | 5 | 6 |
| C | 7 | 8 | 9 |
| D | 10 | 11 | 12 |

However, according to such a frequency interference management technique, frequency interference may occur between nodes if the estimated location is different from an actual location due to a wireless localization error.

Also, according to the fingerprinting wireless localization technique, since the DB is newly searched whenever a location is estimated, complexity of a system increases as an amount of DB is increased. Here, if the number of sample points is decreased to reduce the complexity of the system, a nearest sample point is estimated as the location of the predetermined node, and thus not only a localization error is increased, but also frequency interference is increased. Accordingly, in the current embodiment, performance of frequency interference is measured by applying a technique for improving finger printing precision.

Generally, a K-NN algorithm is used as the technique for improving fingerprinting precision. In the K-NN algorithm, k pieces of learning data near new data may be determined through a Euclidean distance between the learning data and the new data. Accordingly, not only coordinates of one sample point is determined by using the K-NN algorithm, but also the location of predetermined node may be determined by using the k sample points. For example, if k=3, the location may be determined to be an average value of coordinates of three sample points.

Figure 2A:
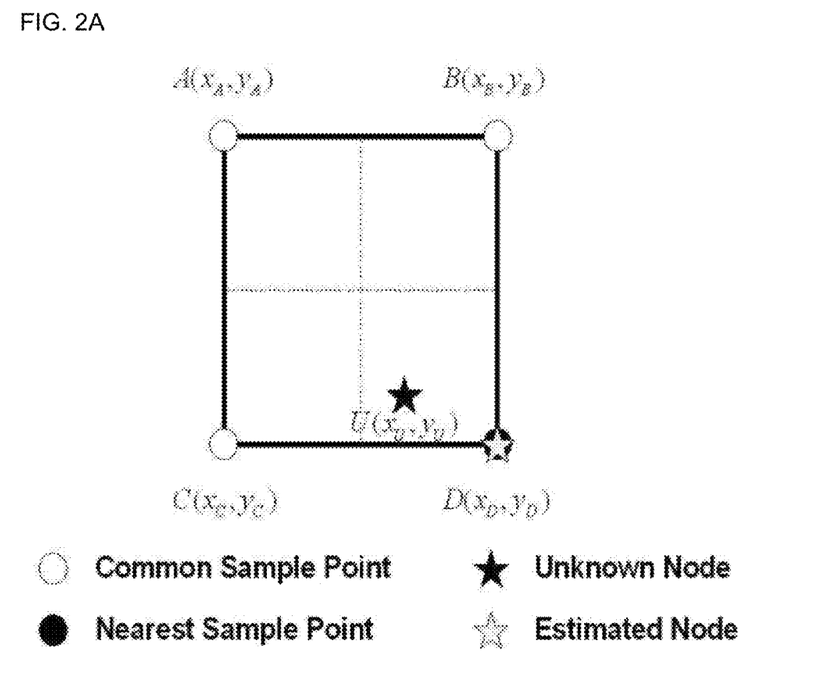
FIGS. 2A and 2B are diagrams for describing a general technique for improving fingerprinting precision.
Figure 2B:
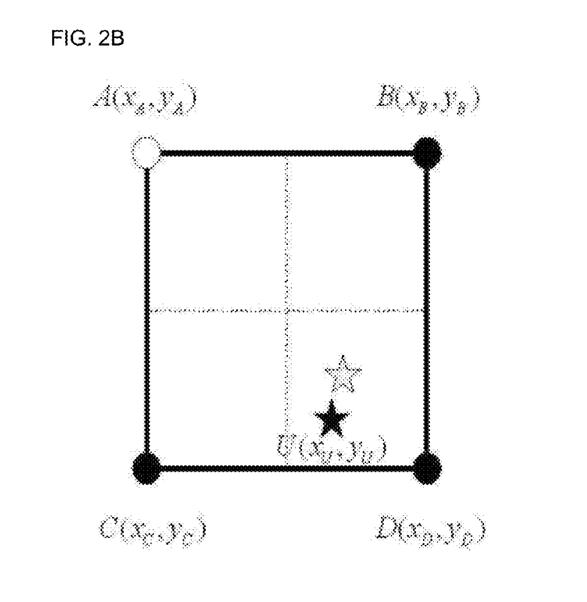

FIGS. 2A and 2B are diagrams for describing a general technique for improving fingerprinting precision. Here, sample points A through D are near a predetermined node U ★ (node to be localized), and the predetermined node U ★ always exists within the four sample points A through D. Of course, if the predetermined node U ★ moves, the predetermined node U ★ may exist other four sample points. Here, it is assumed that when intervals between the predetermined node U ★ and each of the sample points A through D are calculated according to Euclidean distances, the intervals are in an order of D<C<B<A.

Here, in the general technique shown in FIG. 2A, since a DB only includes coordinates of one sample point, the predetermined node U ★ is estimated to be located at the sample point D nearest to the predetermined node U ★, which is 1-NN.

However, a 3-NN average technique shown in FIG. 2B considers three sample points B, C, and D near the predetermined node U ★, and an estimated location Û ☆ of the predetermined node U ★ is calculated to be average coordinates of the three sample points B, C, and D according to Equation 3 below.

$$\hat{U}(x_{\hat{U}}, y_{\hat{U}}) = \frac{D(x_D, y_D) + C(x_C, y_C) + B(x_B, y_B)}{3} \quad \text{[Equation 3]}$$

It may be expected that a localization error may be probabilistically reduced in FIG. 2B compared to FIG. 2A. However, since the 3-NN average technique also estimates that a predetermined node is always in middle (average location) of three sample points, it is still difficult to provide a highly precise location. For example, when a predetermined node exists in a lower right region from among four regions in FIG. 2B, and a location of the predetermined node is estimated by using Equation 3, the location is always estimated to be a middle of three sample points. Thus, a direction to which the predetermined node moves in the lower right region, i.e., directivity of the predetermined node cannot be determined at all.

Accordingly, the present embodiment uses a localization method using a ratio of RSS values of sample points unlike FIGS. 2A and 2B.

Figure 3:
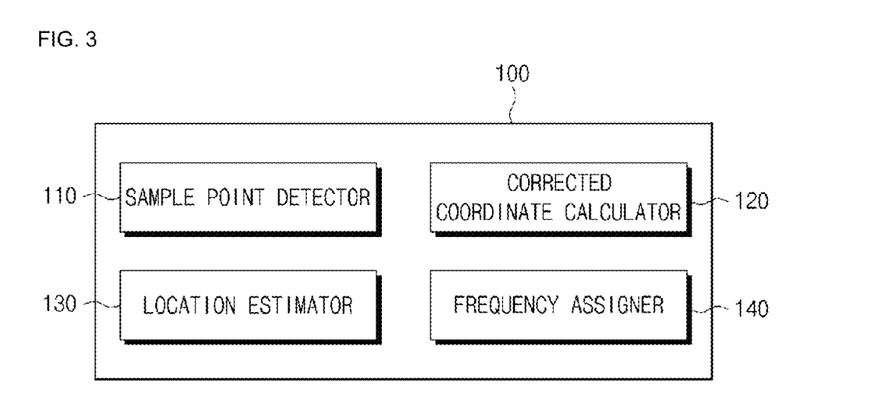
FIG. 3 is a block diagram of a wireless localization apparatus using a fingerprinting technique, according to an embodiment of the present invention.

FIG. 3 is a block diagram of a wireless localization apparatus 100 using a fingerprinting technique, according to an embodiment of the present invention. The wireless localization apparatus 100 includes a sample point detector 110, a corrected coordinate calculator 120, a location estimator 130, and a frequency assigner 140. The wireless localization apparatus 100 according to the current embodiment uses an RSS-based fingerprinting technique that performs localization by using a plurality of access points and a plurality of sample points that are arranged at regular intervals.

The sample point detector 110 detects first through third sample points in an order nearest to a predetermined node, from among a plurality of sample points, via a fingerprinting technique.

The corrected coordinate calculator 120 calculates corrected coordinates by using an RSS value between the predetermined node and the first sample point, an RSS value between the predetermined node and the second sample point, an RSS value between the first and second sample points, an RSS value between the first and third sample points, and a distance between the sample points.

The location estimator 130 estimates a location of the predetermined node by reflecting the corrected coordinates on coordinates of the first sample point.

The frequency assigner 140 assigns a frequency corresponding to the estimated location to the predetermined node. In other words, the corresponding frequency is assigned to a region where the predetermined node is located. Accordingly, frequency assignment information is pre-stored according to regions. Since a frequency is assigned by using a well-known method, details thereof are omitted herein.

Figure 4:
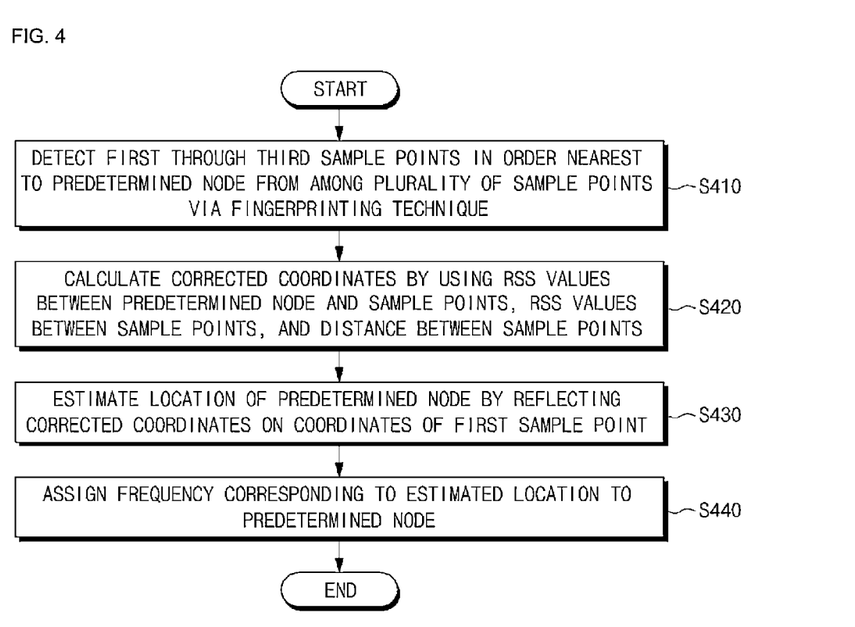
FIG. 4 is a flowchart illustrating a wireless localization method using the wireless localization apparatus of FIG. 3.
Figure 5:
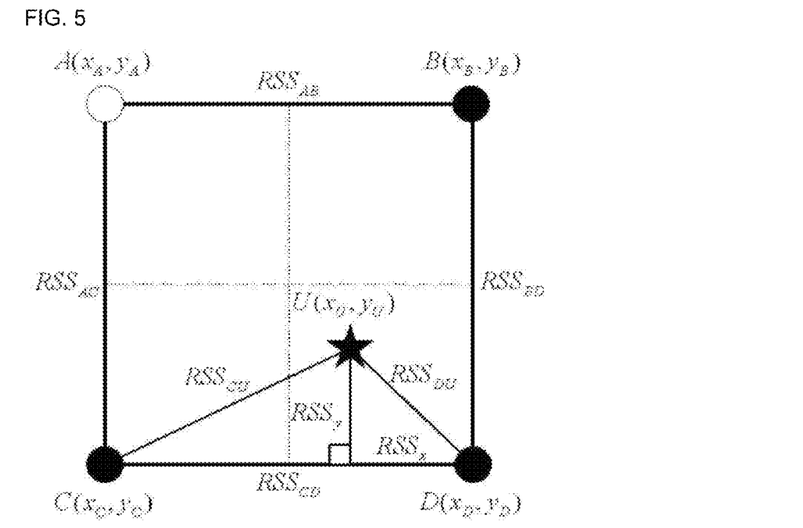
FIG. 5 is a diagram for describing operations S410 through S430 of FIG. 4.

FIG. 4 is a flowchart illustrating a wireless localization method using the wireless localization apparatus 100 of FIG. 3, and FIG. 5 is a diagram for describing operations S410 through S430 of FIG. 4.

In FIG. 5, as described above with reference to FIGS. 2A and 2B, it is assumed that a predetermined node U (★) to be localized exists in a quadrangular region formed by sample points A through D, and that RSS values between the sample points A through D and the predetermined node U are pre-calculated. Also, as described above, three sample points nearest to the predetermined node U are selected by using a 3-NN average technique, and a location of the predetermined node U is estimated based on each RSS vector value.

The current embodiment of the present invention will now be described in detail with reference to FIGS. 4 and 5.

First, the sample point detector 110 detects the first through third sample points D, C, and B in an order nearest to the predetermined node U, from among the plurality of sample points A through D in FIG. 5 via the fingerprinting technique, in operation S410. Accordingly, the first sample point D, the second sample point C, and the third sample point B are detected in the order nearest to the predetermined node U.

Then, the corrected coordinate calculator 120 calculates corrected coordinates in operation S420 by using an RSS value $RSS_{DU}$ between the predetermined node and the first sample point D, an RSS value $RSS_{CU}$ between the predetermined node U and the second sample point C, an RSS value $RSS_{CD}$ between the first sample point D and the second sample point C, an RSS value $RSS_{BD}$ between the first sample point D and the third sample point B, and a distance d between the sample points A through D. Here, since the sample points A through D are arranged at regular intervals, for example, 1 m, the distance d has a uniform value.

Operation S420 will now be described in detail.

In FIG. 5, relationships between the sample points A through D and between the predetermined node U and the sample points A through D are illustrated in terms of RSS instead of a distance because although RSS generally shows a nonlinear characteristic according to distances, the RSS shows a relatively linear characteristic within a certain distance, for example, 10 m. In other words, in the current embodiment, a concept of RSS is applied for wireless localization of the predetermined node U since signal strength has a linear characteristic according to distances within a certain range.

First, in order to obtain coordinates of the predetermined node U, an RSS value of a sample point nearest to the predetermined node U, i.e., the first sample point D is calculated. In other words, an $RSS_x$ value and an $RSS_y$ value of FIG. 5 are estimated. Here, the $RSS_x$ value is an RSS value corresponding to a location difference value of the predetermined node U in an x-axis direction with respect to the location of the first sample point D. The $RSS_y$ value is an RSS value corresponding to a location difference value of the predetermined node U in a y-axis direction with respect to the first sample point D.

In order to estimate the $RSS_x$ value and the $RSS_y$ value, Equations 4 and 5 below are pre-defined. Equations 4 and 5 are obtained by applying the Pythagoras theorem on two triangles shown in FIG. 5.

$$RSS_x^2 + RSS_y^2 = RSS_{DU}^2 \qquad \text{[Equation 4]}$$

Here, $RSS_{DU}$ denotes the RSS value between the predetermined node U and the first sample point D.

$$RSS_y^2 + (RSS_{CD} - RSS_x)^2 = RSS_{CU}^2 \qquad \text{[Equation 5]}$$

Here, $RSS_{CD}$ denotes the RSS value between the first sample point D and the second sample point C, and $RSS_{CU}$ denotes the RSS value between the predetermined node U and the second sample point C.

The $RSS_x$ value and the $RSS_y$ value may be calculated according to Equations 6 and 7 based on the above two quadratic simultaneous equations.

$$RSS_x = \frac{RSS_{CD}^2 + RSS_{DU}^2 - RSS_{CU}^2}{2RSS_{CD}} \qquad \text{[Equation 6]}$$

$$RSS_y = \sqrt{RSS_{DU}^2 - RSS_x^2} \qquad \text{[Equation 7]}$$

The RSS values obtained as such are converted to a meter unit that is a scale of actual coordinates after being divided by a RSS value of each coordinate plane, as shown in Equation 8 below.

$$\hat{x} = \frac{RSS_x}{RSS_{CD}} d, \quad \hat{y} = \frac{RSS_y}{RSS_{BD}} d \qquad \text{[Equation 8]}$$

As shown in Equation 8, when a ratio of the $RSS_x$ value to the $RSS_{CD}$ value that is the RSS value between the first sample point D and the second sample point C is obtained and then the distance d between the sample points A through D, for example, 1 m, is reflected to the ratio, an x-axis corrected coordinate x̂ may be calculated. In other words, the corrected coordinates x̂ is converted to an actual meter unit by dividing the $RSS_x$ value according to Equation 6 by the $RSS_{CD}$ value and then multiplying the result by the distance d.

Also, when a ratio of the $RSS_y$ value to the $RSS_{BD}$ value that is the RSS value between the first sample point D and the third sample point B is obtained and then the distance d between the sample points A through D is reflected to the ratio, a y-axis corrected coordinate ŷ may be calculated. In other words, the corrected coordinates ŷ is converted to an actual meter unit by dividing the $RSS_y$ value according to Equation 6 by the $RSS_{BD}$ value and then multiplying the result by the distance d.

After calculating the corrected coordinates (x̂,ŷ) as above, a location of the predetermined node U is estimated. In other words, the location estimator 130 estimates the location of the predetermined node U in operation S430 by reflecting the corrected coordinates (x̂,ŷ) to coordinates $D(x_D,y_D)$ of the first sample point D nearest to the predetermined node U, as represented by Equation 9 below.

$$\hat{U}=D(x_D,y_D)\pm(\hat{x},\hat{y}) \qquad \text{[Equation 9]}$$

Here, Û denotes an estimated location of the predetermined node U, and ± is individually applied according to + or − to the x-axis corrected coordinate x̂ and the y-axis corrected coordinate ŷ according to a relative location of the predetermined node U with respect to the first through third sample points D, C, and B.

Referring to FIG. 5, an estimated x-coordinate value of the predetermined node U is calculated by subtracting (−)x̂ from an $x_D$ value, and an estimated y-coordinate value is calculated by adding (+)ŷ to a $y_D$ value. In other words, in Equation 9, ± is adaptively used according to the locations of the predetermined node U and first through third sample points D, C, and B.

Then, the frequency assigner 140 assigns a frequency corresponding to the estimated location Û to the predetermined node U, in operation S440. The assigning of frequency has been described above with reference to FIG. 1.

According to the current embodiment described above, since a localization technique using an RSS vector value ratio of sample points is used, the location of the predetermined node U may be highly precisely estimated compared to the general technique described with reference to FIGS. 2A and 2B, and directivity of the predetermined node U if the predetermined node U moves may be precisely estimated.

Following simulation performance evaluations support that highly precise localization performance is obtained via the technique according to the current embodiment compared to other techniques. Simulation environments for the current embodiment are as follows.

Simulations using matrix laboratory (MATLAB) are performed so as to evaluate performances of frequency interference management using various fingerprinting algorithms. A mean distance error (MDE) and a channel interference ratio, which are generated during wireless localization according to distances between sample points, are used as performance indexes.

For the simulations, a square space of 100 $m^2$ as shown in FIG. 1A is used, and an RSS is measured by using Equation 1 while changing a distance between sample points to be stored in a DB from 1 m to 10 m by 1 m.

Here, a reference distance ($d_0$ of Equation 1) of RSS is set to be 1 m, and a pass loss coefficient (q of Equation 1) is set to be 2. Four access points are used as in FIG. 1A, wherein coordinates of the access points are respectively (0,100), (100,100), (0,0), and (100,0). One access point is divided into four regions, wherein each region has a square shape having a size of 25 $m^2$. Here, it is assumed that one channel is used per region, and channel interference occurs when a predetermined node is determined to be in a wrong region due to a location estimation error. The predetermined node to be localized is randomly located, and overall processes of estimating a location via wireless localization are performed 50,000 times.

Results of the simulations are as follows.

First, a number of sample points according to distances between sample points is described. As described above, since an amount of DBs according to distances between sample points affects a throughput of a system, the number of sample points according to the distances between sample points is first calculated.

Figure 6:
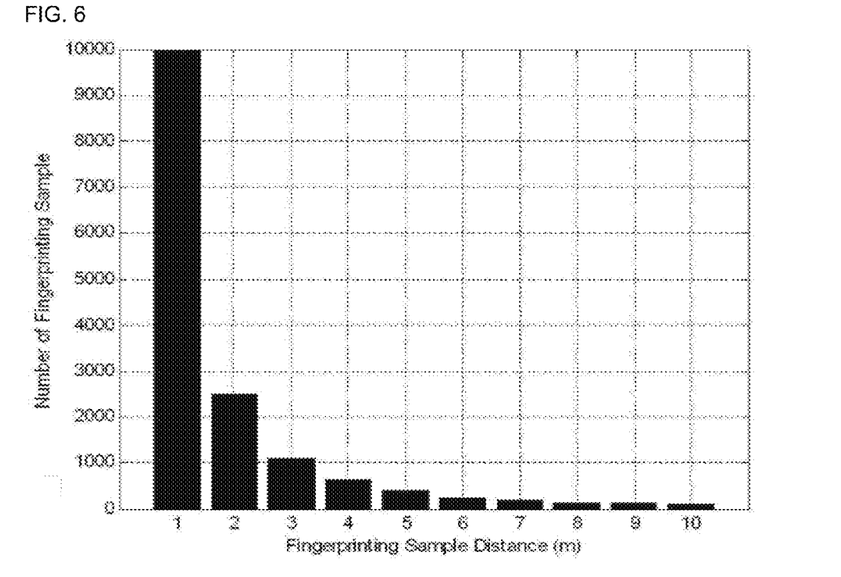
FIG. 6 is a graph of an amount of data bases according to distances between sample points, according to an embodiment of the present invention.

FIG. 6 is a graph of an amount of data bases according to sample point distances, according to an embodiment of the present invention. As shown in FIG. 6, when the distance between the sample points is 1 m, 10,000 sample points are needed, and thus complexity of DB is increased. However, when the distance is 2 m or more, the number of sample points is remarkably reduced, and thus a DB may be efficiently built compared to when the distance is 1 m. However, when location coordinates stored in the DB is less, a wireless localization error increases as the distance is increased. Thus, a suitable distance between sample points is required.

Then, MDEs according to the distances are compared.

Equation 10 below is used to calculate an MDE that is a performance evaluation scale for all considered wireless localization techniques, and shows an average of location differences between actual locations (x,y) of M predetermined nodes and estimated locations (x̂,ŷ) of the M predetermined nodes. For reference, the estimated location (x̂,ŷ) of Equation 10 is different from the corrected coordinates (x̂,ŷ) of Equation 7, and denotes a finally estimated location as in Equation 9.

$$\frac{1}{M}\sum_{i=1}^{M}\sqrt{(\hat{x}_i - x_i)^2 + (\hat{y}_i - y_i)^2} \qquad \text{[Equation 10]}$$

Figure 7:
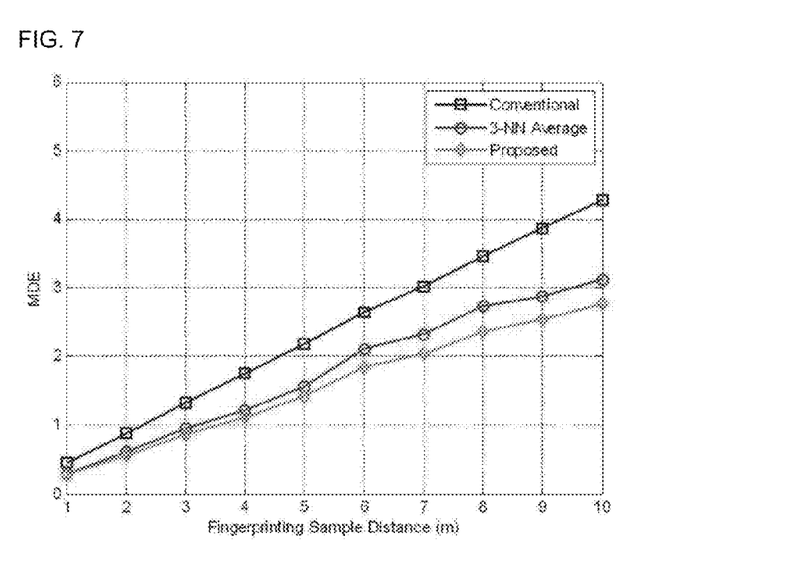
FIG. 7 is a graph of a mean distance error performance according to distances between sample points, according to an embodiment of the present invention.

FIG. 7 is a graph of an MDE performance according to distances between sample points, according to an embodiment of the present invention. In FIG. 7, 'Conventional' and '3-NN Average' respectively denote cases when the techniques of FIGS. 2A and 2B are used.

Overall MDE performances of all techniques are deteriorated as the distance is increased. However, in the proposed technique of the current embodiment (denoted by "Proposed"), the MDE performance is improved by 0.1 m and 1 m or above respectively in the distances 1 m and 10 m compared to the general techniques (denoted by "Conventional"). This may be because in the general technique, the location of the predetermined node is estimated to be the location of the sample point nearest to the RSS value of the predetermined node, whereas in the proposed technique, generation of an error is efficiently reduced by using the three sample points.

Specifically, when the distance is 10 m, a localization error may be increased since the amount of DB is less, but the throughput of the DB may be reduced since the DME performance of the proposed technique in 10 m is almost the same as the DME performance of the general techniques in 7 m. As a result, the location may be accurately estimated with the lesser amount of DB in the current embodiment compared to the general techniques.

Also, even when the distance is 2 m to 4 m where localization precision is high, the MDE performance of the proposed technique in 4 m is almost the same as the MDE performance of the general techniques in 2 m. Accordingly, in the current embodiment, the location may be more precisely estimated by using the lesser number of sample points in the current embodiment since the distance between the sample points may be increased. Also, in the current embodiment, the location may be highly precisely estimated while obtaining more gains in terms of throughput than when the distance is 10 m.

Meanwhile, since the proposed technique, wherein the location is estimated by converting the ratio of RSS values of the sample points to an actual distance shows only about 0.2 m improvement than a technique using an average value (denoted by "3-NN Average"), it may be determined that the technique of the current embodiment and the 3-NN average technique have the similar performance. However, as described above, since the 3-NN average technique uses the average value of three sample points nearest to the predetermined node, the estimated location of the predetermined node is always at the center of the three sample points. On the other hand, according to the proposed technique, the directivity of the predetermined node may be estimated by improving the accuracy of the estimated location. Accordingly, the proposed technique substantially provides the highly precise location than the 3-NN average technique.

Figure 8:
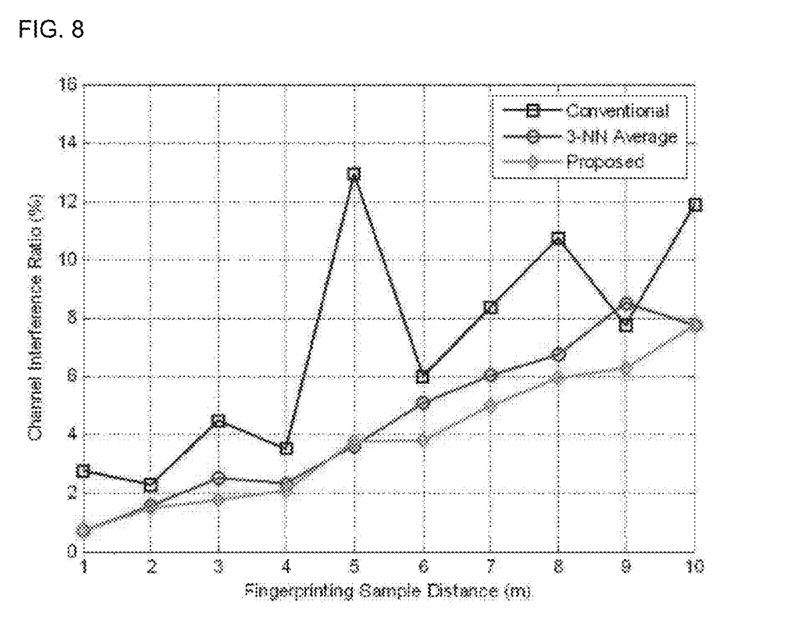
FIG. 8 is a graph of channel interference ratio according to distances between sample points, according to an embodiment of the present invention.

Next, results of comparing channel interference ratios according to distances between sample points will now be described. FIG. 8 is a graph of a channel interference ratio according to distances between sample points, according to an embodiment of the present invention. Here, performance is increased as a CIR value is decreased.

Like the MDE performance described above, the channel interference ratio increases in overall as the distance between the sample points is increased. Specifically, since a square region having a size of 25 m² is formed in a simulation environment, the interference ratio is remarkably increased in the general technique (denoted by "Conventional") when the distance between sample points is 5 m. However, in the technique proposed in the current embodiment (denoted by "Proposed"), such a phenomenon is not shown since the channel interference ratio is affected less by an edge of the area.

Also, the channel interference ratio of the proposed technique of the current embodiment is reduced about 2 to 9% than the general technique. Also, about 1% point is improved in the proposed technique than the technique using an average value (denoted by "3-NN Average"), since as described above, the current embodiment approaches the predetermined node with directivity and estimates the location highly precisely.

Based on such results of simulations, it is determined that not only the MDE performance and the channel interference ratio are improved in the technique of the current embodiment compared to the general technique, but also that the throughput of the DB is efficiently reduced in the current embodiment, thereby reducing complexity of the system.

As described above, the present invention provides a region-based frequency interference management technique using a fingerprinting wireless localization technology for an efficient M2M communication in an intelligent factory. By using the frequency interference management technique, an operator may efficiently manage interference between frequencies required to recognize operation states or environments of machines in the intelligent factory while warning and handling dangerous situations via continuous location estimation.

Also, it is determined that localization precision of the proposed technique is improved by about 0.1 to 1.6 m than the general technique, and the frequency interference ratio of the proposed technique is also reduced by about 2 to 4% point in average than the general technique, based on the results of simulations on the wireless localization algorithms. Specifically, the localization precision is improved in the proposed technique by about 0.2 m than the 3-NN average technique, and since the directivity of the predetermined node is also estimated in the proposed technique, the throughput may be efficiently reduced while accurately estimating the location of the predetermined node.

According to the wireless localization method and the wireless location apparatus using the fingerprinting technique of the present invention, a location of a predetermined node may be accurately estimated by using the wireless localization method, and a frequency may be effectively assigned based on the estimated location. Also, since a directivity of the predetermined node may also be estimated by using the wireless localization method using a ratio of RSS values of a plurality of sample points, throughput may be reduced while providing a highly precise location.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wireless localization method that performs localization by using a plurality of access points at a plurality of sample points having known physical locations that are arranged at regular distances from each other, the wireless localization method comprising:

detecting a first sample point, a second sample point, and a third sample point from the plurality of sample points that are most proximate to a predetermined node;

calculating corrected coordinates of the predetermined node by using a received signal strength (RSS) between the predetermined node and the first sample point, an RSS value between the predetermined node and the second sample point, an RSS value between the first sample point and second sample point, an RSS value between the first sample point and third sample point, and a distance between the plurality of sample points; and estimating a location of the predetermined node by reflecting the corrected coordinates in relation to the coordinates of the first sample point, wherein the calculating of the corrected coordinates comprises:

estimating an $RSS_x$ value and an $RSS_y$ value respectively corresponding to location difference values of the predetermined node in an x-axis and a y-axis with respect to a location of the first sample point, by using the RSS value between the predetermined node and the first sample point, the RSS value between the predetermined node and the second sample point, and the RSS value between the first and second sample points; and calculating an x-axis corrected coordinate $\hat{x}$ by reflecting the distance between the plurality of sample points to a ratio of the $RSS_x$ value to the RSS value between the first and second sample points, and calculating a y-axis corrected coordinate $\hat{y}$ by reflecting the distance between the plurality of sample points to a ratio of the $RSS_y$ value to the RSS value between the first and third sample points, wherein the estimated $RSS_x$ and $RSS_y$ values are further defined according to equations below:

$$RSS_x = \frac{RSS_{CD}^2 + RSS_{DU}^2 - RSS_{CU}^2}{2RSS_{CD}}$$

and $$RSS_y = \sqrt{RSS_{DU}^2 - RSS_x^2},$$

wherein $RSS_{CD}$ denotes the RSS value between the first and second sample points, $RSS_{DU}$ denotes the RSS value between the predetermined node and the first sample point, and $RSS_{CU}$ denotes the RSS value between the predetermined node and the second sample point.

2. The wireless localization method of claim 1, further comprising assigning a frequency corresponding to the estimated location with respect to the predetermined node.

3. The wireless localization method of claim 1, wherein the x-axis corrected coordinates $\hat{x}$ and the y-axis corrected coordinates $\hat{y}$ are calculated according to equations below:

$$\hat{x} = \frac{RSS_x}{RSS_{CD}}d, \quad \hat{y} = \frac{RSS_y}{RSS_{BD}}d,$$

wherein $RSS_{BD}$ denotes the RSS value between the first and third sample points and d denotes the distance between the plurality of sample points.

4. The wireless localization method of claim 3, wherein the location of the predetermined node is estimated according to an equation below:

$$\hat{U} = D(x_D, y_D) \pm (\hat{x}, \hat{y})$$

wherein $\hat{U}$ denotes the estimated location of the predetermined node, $D(x_D, y_D)$ denotes a location of the first sample point, and ± is individually applied as + or − with respect to the x-axis corrected coordinate $\hat{x}$ and the y-axis corrected coordinate $\hat{y}$, according to a relative location of the predetermined node with respect to the first through third sample points.

5. The wireless localization method of claim 1, wherein the method uses a fingerprinting technique.

6. The wireless localization method of claim 1, wherein the first sample point, the second sample point, and the third sample point are detected in an order based on proximity to the predetermined node.

7. A wireless localization apparatus that performs localization by using a plurality of access points at a plurality of sample points having known physical locations that are arranged at regular distances from each other, the wireless localization apparatus comprising:

at least one processor;

a sample point detector for detecting a first sample point, a second sample point, and a third sample point from the plurality of sample points that are most proximate to a predetermined node using the at least one processor;

a corrected coordinate calculator for calculating corrected coordinates of the predetermined node by using a received signal strength (RSS) between the predetermined node and the first sample point, an RSS value between the predetermined node and the second sample point, an RSS value between the first sample point and third sample point, and a distance between the plurality of sample points using the at least one processor; and a location estimator for estimating a location of the predetermined node by reflecting the corrected coordinates on coordinates of the first sample point using the at least one processor, wherein the corrected coordinate calculator estimates an RSShd x value and an $RSS_y$ value respectively corresponding to location difference values of the predetermined node in an x-axis and a y-axis with respect to a location of the first sample point, by using the RSS value between the predetermined node and the first sample point, the RSS value between the predetermined node and the second sample point, and the RSS value between the first and second sample points, and then calculates an x-axis corrected coordinate $\hat{x}$ by reflecting the distance between the plurality of sample points to a ratio of the $RSS_x$ value to the RSS value between the first and second sample points, and calculating a y-axis corrected coordinate $\hat{y}$ by reflecting the distance between the plurality of sample points to a ratio of the $RSS_y$ value to the RSS value between the first and third sample points, and wherein the estimated $RSS_x$ and $RSS_y$ values are defined according to equations below:

$$RSS_x = \frac{RSS_{CD}^2 + RSS_{DU}^2 - RSS_{CU}^2}{2RSS_{CD}}$$

and $$RSS_y = \sqrt{RSS_{DU}^2 - RSS_x^2},$$

wherein $RSS_{CD}$ denotes the RSS value between the first and second sample points, $RSS_{DU}$ denotes the RSS value between the predetermined node and the first sample point, and $RSS_{CU}$ denotes the RSS value between the predetermined node and the second sample point.

8. The wireless localization apparatus of claim 7, further comprising a frequency assigner for assigning a frequency corresponding to the estimated location with respect to the predetermined node using the at least one processor.

9. The wireless localization apparatus of claim 7, wherein the x-axis corrected coordinates $\hat{x}$ and the y-axis corrected coordinates $\hat{y}$ are calculated according to equations below:

$$\hat{x} = \frac{RSS_x}{RSS_{CD}}d, \quad \hat{y} = \frac{RSS_y}{RSS_{BD}}d,$$

wherein $RSS_{BD}$ denotes the RSS value between the first and third sample points and d denotes the distance between the plurality of sample points.

10. The wireless localization apparatus of claim 9, wherein the location of the predetermined node is estimated according to an equation below:

$$\hat{U} = D(x_D, y_D) \pm (\hat{x}, \hat{y})$$

wherein $\hat{U}$ denotes the estimated location of the predetermined node, $D(x_D, y_D)$ denotes a location of the first sample point, and ± is individually applied as + or − with respect to the x-axis corrected coordinate $\hat{x}$ and the y-axis corrected coordinate $\hat{y}$, according to a relative location of the predetermined node with respect to the first through third sample points.

11. The wireless localization apparatus of claim 7, wherein the apparatus uses a fingerprinting technique.

\* \* \* \* \*